(12) United States Patent
Angerer et al.

(10) Patent No.: US 11,159,730 B2
(45) Date of Patent: Oct. 26, 2021

(54) BENDING MACHINE COMPRISING A WORK AREA IMAGE DETECTING DEVICE AND METHOD FOR REPRESENTING A WORK AREA

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Verena Steininger, Linz (AT); Helmut Theis, Pfarrkirchen (AT); Manfred Waldherr, Linz (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 456 days.

(21) Appl. No.: 16/327,485

(22) PCT Filed: Aug. 30, 2017

(86) PCT No.: PCT/AT2017/060211
§ 371 (c)(1),
(2) Date: Feb. 22, 2019

(87) PCT Pub. No.: WO2018/039695
PCT Pub. Date: Mar. 8, 2018

(65) Prior Publication Data
US 2019/0176201 A1    Jun. 13, 2019

(30) Foreign Application Priority Data
Sep. 2, 2016 (AT) .............................. A 50783/2016

(51) Int. Cl.
*G06K 9/00*    (2006.01)
*H04N 5/232*    (2006.01)
(Continued)

(52) U.S. Cl.
CPC ........... *H04N 5/23293* (2013.01); *B21D 5/02* (2013.01); *G06T 5/50* (2013.01); *G06T 7/337* (2017.01);
(Continued)

(58) Field of Classification Search
CPC ...... G06K 9/6202; G06K 9/6203; G06T 7/00; G06T 7/337; G06T 5/50; H04N 5/23293;
(Continued)

(56) References Cited

U.S. PATENT DOCUMENTS 4,656,861 A * 4/1987 Koyama ............... B21D 5/0254
    483/29
4,660,402 A * 4/1987 Hongo ..................... B21D 5/02
    72/319
(Continued)

FOREIGN PATENT DOCUMENTS

AT      511 557 A1    12/2012
CN    101668597 A    3/2010
(Continued)

OTHER PUBLICATIONS

International Search Report in PCT/AT2017/060210, dated Feb. 1, 2018.
(Continued)

*Primary Examiner* — Amir Alavi
(74) *Attorney, Agent, or Firm* — Collard & Roe, P.C.

(57) ABSTRACT

A bending machine has a work area image capture apparatus. A longitudinal expanse and the movement direction of the press beam define a working plane, which establishes a front working and manipulation space and a rear machine
(Continued)

space, which is distinguished from the former and, in particular, closed off. An image capture apparatus is disposed in the working and manipulation space above the machine table, in a center section of the longitudinal expanse of the press beam, which apparatus is connected with a display, which is configured for representation of the captured image of the capture region. The image capture apparatus is disposed in a press beam casing, and has two image capture devices, wherein each image capture device captures a partial section in the direction of the machine table.

23 Claims, 4 Drawing Sheets

(51) Int. Cl.
   *B21D 5/02* (2006.01)
   *G06T 5/50* (2006.01)
   *G06T 7/33* (2017.01)
   *H04N 5/247* (2006.01)

(52) U.S. Cl.
   CPC ... *H04N 5/247* (2013.01); *G06T 2207/20221* (2013.01)

(58) Field of Classification Search
   CPC .......... H04N 5/247; B21D 5/002; B21D 5/02; B21D 5/0209; B21D 5/0281; B21D 5/0254; B21D 5/047; B21D 55/00; B21D 37/145; B21D 37/04
   See application file for complete search history.

(56) References Cited

U.S. PATENT DOCUMENTS

| | | | | |
|---|---|---|---|---|
| 4,856,315 A | * | 8/1989 | Salvagnini | B21D 5/047 72/306 |
| 5,012,661 A | * | 5/1991 | Gatti | B21D 5/02 72/21.1 |
| 5,176,017 A | * | 1/1993 | Tokai | B21D 5/0209 72/6.1 |
| 6,644,090 B2 | * | 11/2003 | Gasparini | B21D 5/0209 72/481.1 |
| 6,871,521 B2 | * | 3/2005 | Sperrer | B21D 5/02 700/165 |
| 8,833,131 B2 | | 9/2014 | Reiter et al. | |
| 9,415,477 B2 | | 8/2016 | Tauchmann et al. | |
| 9,448,650 B2 | | 9/2016 | Rogers et al. | |
| 9,547,300 B2 | | 1/2017 | Angerer et al. | |
| 9,561,571 B2 | | 2/2017 | Wielens et al. | |
| 9,808,647 B2 | * | 11/2017 | Rhodes | A61N 5/0624 |
| 10,500,623 B2 | * | 12/2019 | Meneghetti | B21J 13/08 |
| 10,835,942 B2 | * | 11/2020 | Weykamp | B60R 19/18 |
| 2013/0276280 A1 | | 10/2013 | Wielens et al. | |
| 2019/0176201 A1 | * | 6/2019 | Angerer | H04N 5/247 |
| 2019/0210083 A1 | * | 7/2019 | Angerer | G06T 7/00 |

FOREIGN PATENT DOCUMENTS

| | | |
|---|---|---|
| CN | 104981304 A | 10/2015 |
| EP | 2 590 040 B1 | 5/2013 |
| JP | H07214172 A | 8/1995 |
| JP | 2004-202506 A | 7/2004 |
| JP | 3635277 B2 | 4/2005 |
| JP | 3636325 B2 | 4/2005 |
| JP | 2006/289455 A | 10/2006 |
| JP | 2013/158787 A | 8/2013 |
| JP | 2014/502561 A | 2/2014 |

OTHER PUBLICATIONS

International Search Report in PCT/AT2017/060211, dated Jan. 24, 2018.

International Search Report in PCT/AT2017/060212, dated Feb. 1, 2018.

\* cited by examiner

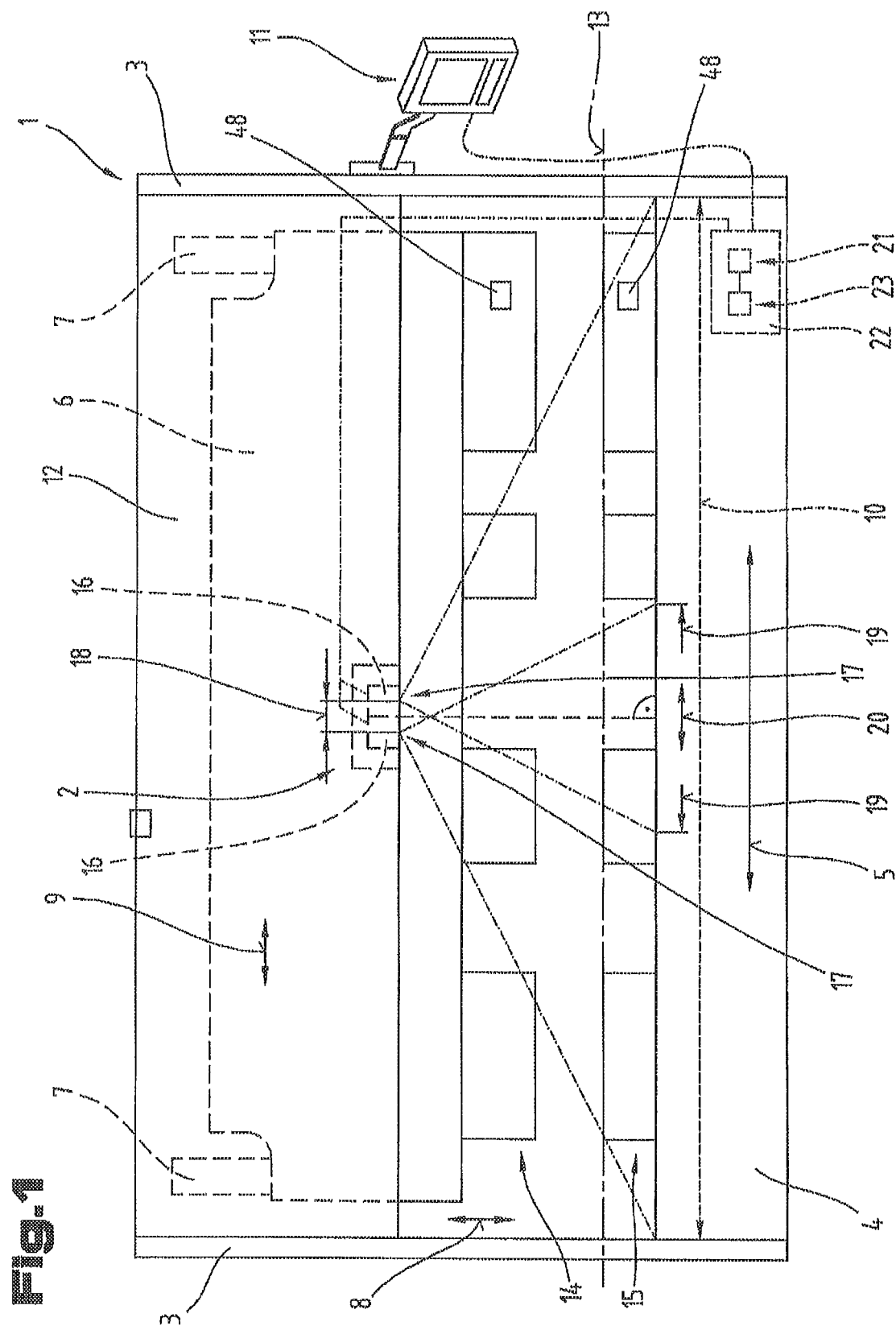

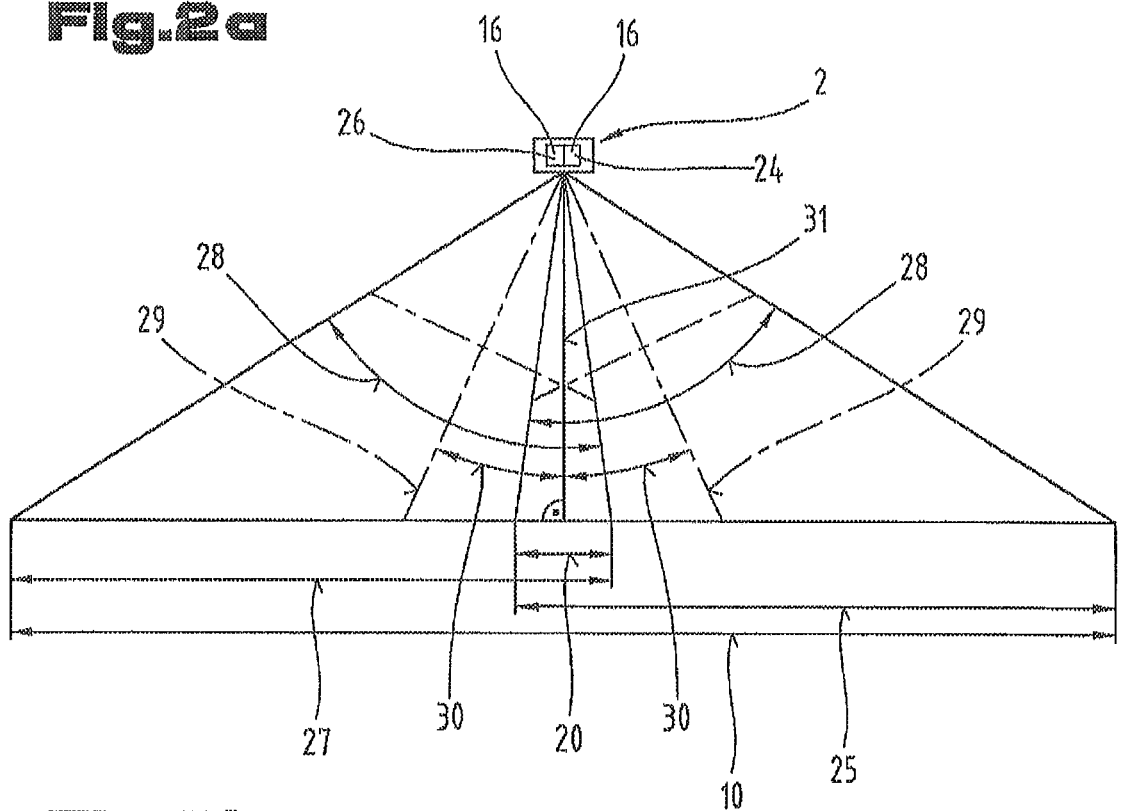
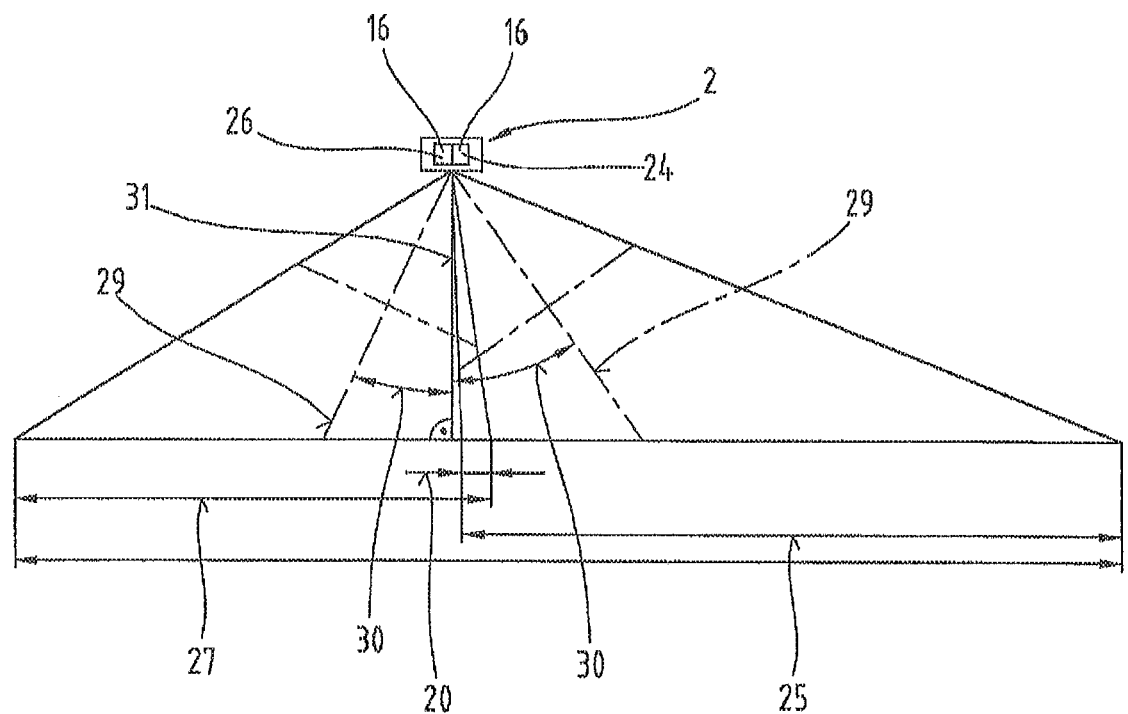

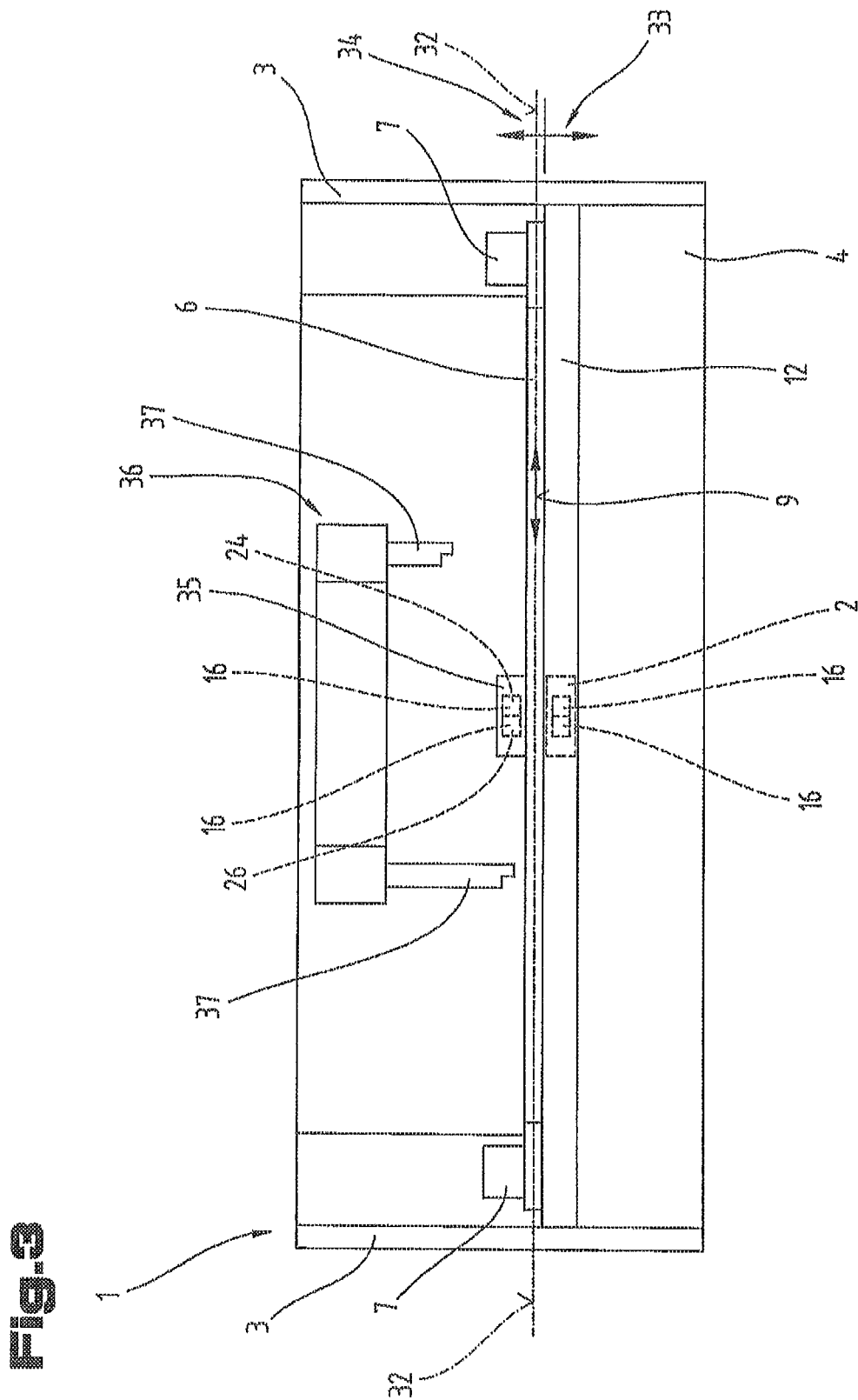

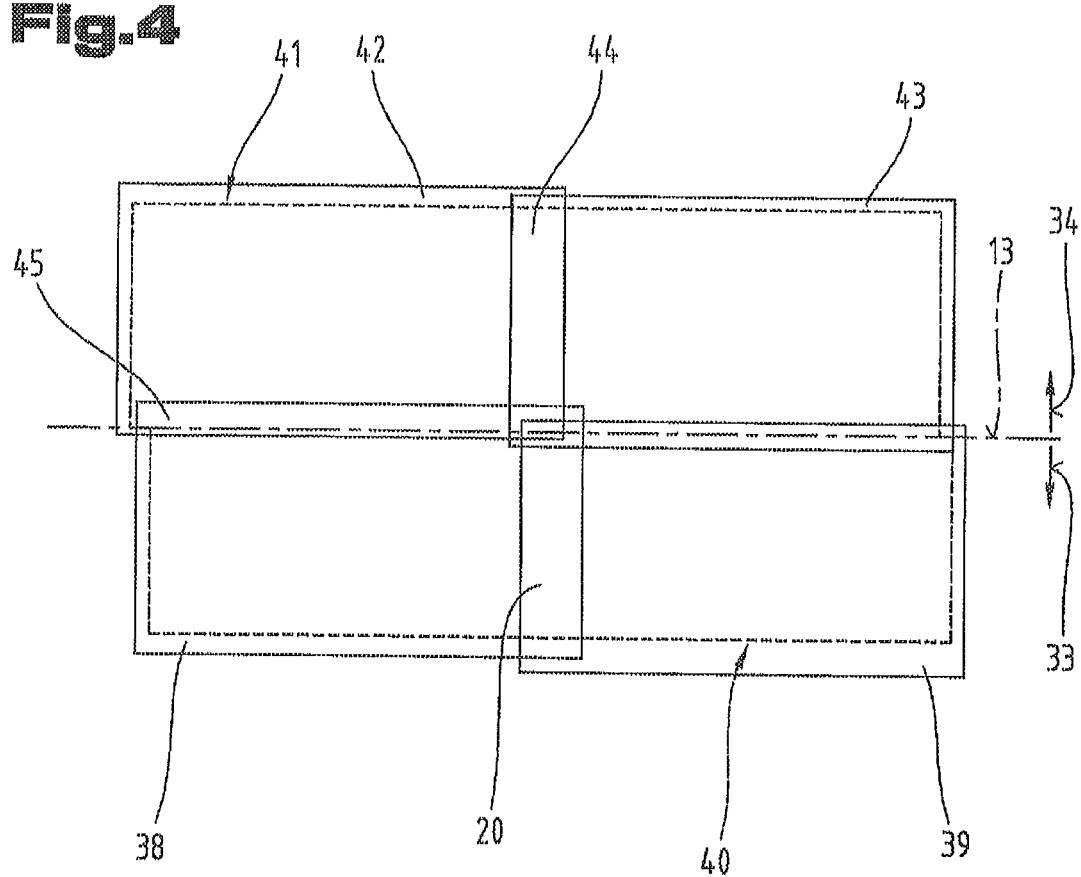
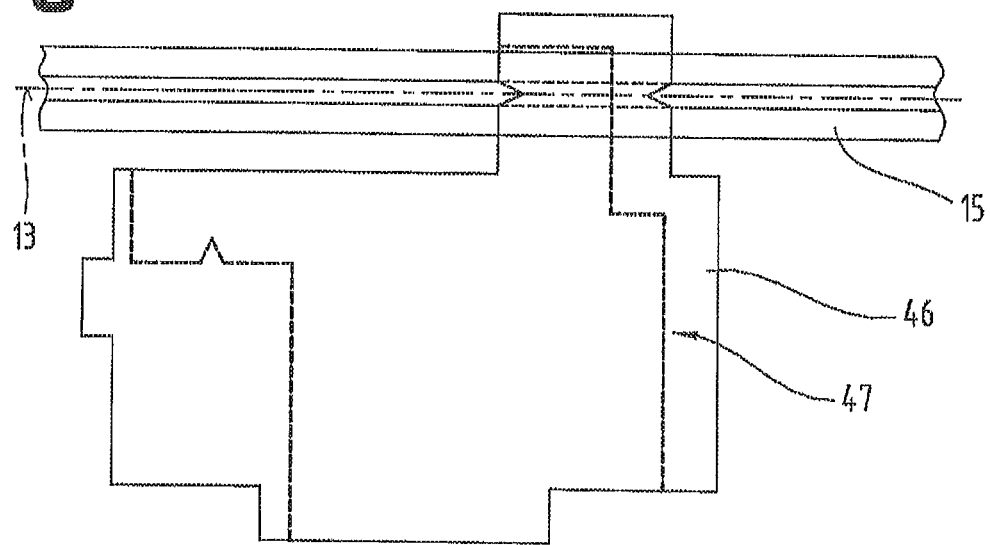

BENDING MACHINE COMPRISING A WORK AREA IMAGE DETECTING DEVICE AND METHOD FOR REPRESENTING A WORK AREA

CROSS REFERENCE TO RELATED APPLICATIONS

This application is the National Stage of PCT/AT2017/060211 filed on Aug. 30, 2017, which claims priority under 35 U.S.C. § 119 of Austrian Application No. A 50783/2016 filed on Sep. 2, 2016, the disclosure of which is incorporated by reference. The international application under PCT article 21(2) was not published in English.

The invention relates to a bending machine having a work area image capture apparatus.

The work area or field of vision of a machine operator of a bending machine, specifically an air bending machine, is dominated by the machine table and, above all, by the press beam, based on the design. In particular, the press beam, with the bending tools disposed on it, greatly restricts the view into the machine interior, where the rear stop apparatus with the contact fingers is situated, in most cases. Furthermore, it is usual to dispose several different types of bending tools on the press beam, so as to thereby be able to perform different bending transformations along the press beam. For this purpose, the machine operator must supply the workpiece to be formed to the bending tools in the correct sequence and with the correct orientation, in each instance.

If a bending machine is used for series production of a greater number of workpieces to be processed in the same way, the machine operator is already well familiar with the individual work steps and will therefore reliably perform the operating actions, in particular correctly oriented feed of the workpiece.

In the case of smaller numbers of items to be produced in series, in particular in the case of a number tending toward one, a machine operator does not have the necessary routine, and this brings with it the risk that a workpiece will be bent incorrectly, in particular in the case of complex bent parts. Since a machine operator must coordinate and monitor the most varied actions, in part almost simultaneously, in particular correct orientation at the correct bending station and correct contact of the workpiece with the rear stop, an unnecessarily high level of stress is caused by this. Since the rear stop, in particular, generally cannot be seen directly due to the design conditions of the bending machine, the machine operator must bend over so as to be able to check that the workpiece lies against the rear stop when it is inserted, and this brings with it not only additional physical stress but also a risk of injury, due to the sharp-edged metallic sheet-metal parts.

During proper operation of a bending machine, the machine operator is required to perform control tasks and monitoring tasks that require attention at different locations, some of which are spaced far apart from one another, at the same time, to the greatest possible extent. At the same time, it is necessary to take orientation processes of the workpiece to be formed, some of which processes are complex, into account.

For example, EP 2 590 040 B1 discloses a bending machine, in the case of which two cameras are disposed on the press beam, which cameras capture the front work area of the bending machine, in particular a workpiece to be formed that has been inserted, and wherein after determination of the orientation of the workpiece, orientation information is projected onto the workpiece by a projector. In this regard, the two cameras are disposed in the end regions of the press beam and in front of the press beam. With regard to the optical image quality, lateral placement of the camera has the disadvantage that the distance between the camera and the section to be captured is great, and therefore the relative resolution capacity of the camera is reduced. This problem could be eliminated, to the greatest possible extent, by using telephoto lenses, but then sections in edge regions of the bending machine could no longer be captured. Zoom lenses are hardly suitable, due to the precision mechanics required, in view of the useful lifetime and the operating surroundings. However, placement of elements such as a camera or a projector in front of the press beam has a further decisive disadvantage, in that a great risk of damage exists for objects disposed in this manner. Sheet-metal parts are often supplied to the bending machine using an indoor crane, and this can easily lead to damage to apparatuses disposed in front of the press beam.

Also, the metal sheet can make contact with the press beam as it bends upward, and damage apparatuses affixed there.

A plate division system is known from DE 10 2008 014 869 A1, in which a longitudinally extended work area is captured by a camera and evaluation information is projected, by a laser projector, onto workpieces that move along the apparatus. As is evident from the document, a large region must be captured by the camera, and this places great demands on the optical system and the resolution of the camera. In particular, wide-angle lenses are required for this purpose, which are known to cause clear image distortions, particularly in the edge regions. The camera is disposed above the processing path, since no impairments caused by manipulation forming or bending forming is to be expected here.

A metal sheet insertion aid is known from JP 5856860 B2, in which a camera in the machine space is directed at the rear stop and the inserted metal sheet. In the captured image, a sheet-metal edge or a distinctive point of the metal sheet is determined and compared with a reference position. In the event of a deviation, a projector projects a marking onto the metal sheet, and the metal sheet must be oriented relative to this marking, with reference to the rear stop. The camera and the projector are affixed to an apparatus that can be moved parallel to the press beam. From the prior art, apparatuses are known in which cameras are placed on a bending machine in such a manner that the optical conditions for the cameras are disadvantageous due to this placement. In particular, however, the prior art shows placement positions that are in the direct hazard region in front of a bending machine.

WO 03/035294 A1 discloses an optical safety device, which comprises two CCD cameras, each of which are disposed laterally on the hydraulic cylinders of the bending machine, in immovable manner. The optical safety device can be used, according to different embodiments, for the purpose of detecting the position of an operator and/or a body part of the operator in front of the system and/or in front of the processing region.

However, it is not known from the prior art to capture the entire work area of a bending machine, in particular the work area in front of the bending machine, wherein the image capture means is to be placed so as to be projected against damage caused by manipulation work during feed and removal of the workpiece or against damage during the bending process.

The task of the invention therefore lies in capturing the work area of a bending machine, wherein high detail resolution is achieved and, at the same time, during proper operation, very good protection of the image capture apparatuses is provided, without restricting the work area of the bending machine.

The task of the invention is accomplished by a bending machine having a work area image capture apparatus. The bending machine has a machine frame, a longitudinally extended machine table, fixed in place, and a longitudinally extended press beam, wherein the press beam is guided in the machine frame and held by a drive means, so as to be movable relative to the latter. The machine frame furthermore has two side parts, which are spaced apart from one another by a machine width in the direction of the longitudinal expanse of the machine table. The longitudinal expanse and the movement direction of the press beam define a working plane, wherein the working plane establishes a front working and manipulation space and a rear machine space, which is distinguished from the former and, in particular, closed off. An image capture apparatus is disposed in the working and manipulation space, above the machine table, in a center section of the longitudinal expanse of the press beam, wherein a capture region of the image capture apparatus is oriented in the direction of the machine table. The image capture apparatus is connected with a display means, which is configured for representation of the captured image of the capture region. The image capture apparatus is disposed in a press beam casing and has two image capture means, wherein each image capture means captures a partial section in the direction of the machine table.

The particular advantage of this embodiment lies in that on the one hand, the image capture apparatus is disposed in an area in front of the machine, in which the risk of damage caused by manipulation work with the workpiece or due to the bending process is reduced to the greatest possible extent. On the other hand, in this placement position there is a good view of the work area, in particular of the machine table with the inserted metal sheet to be formed and/or of the inserted lower tools, as well as of the upper tools inserted into the press beam. In particular, this free view by no means restricts the sheet-metal manipulation space or the usable space for the metal sheet that is bending upward.

By means of the embodiment with two cameras, the result is furthermore achieved that machine tables having a great longitudinal expanse can also be captured with it.

A further development consists in that the image capture means is formed by a 2D camera, for example by CCD cameras having a resolution of at least 3 Mpx. Preferably, the camera has a resolution of 5 Mpx. In this way, even wide bending machines having a longitudinal expanse of the machine table of more than 1 m can be covered by the capture region and captured with sufficiently good local resolution. The required resolution capacity is essentially determined by the local resolution, according to which a pixel must correspond to a real area having a dimension of less than 1 mm.

A further development also consists in that the image capture means is formed by a laser scanner. In contrast to a 2D camera, which captures the entire image region with the camera-specific resolution, the region to be captured can be selected precisely with a scanner, and, in particular, can also have a format that deviates from the rectangular format. An inserted metal sheet generally has a noticeable difference in terms of the degree of reflection relative to the surroundings. For this reason, the outer shape of the metal sheet can also be determined very quickly by means of a scanning process, which is based on a determination of the difference in intensity of the reflected scan beam. Also, multiple regions along the longitudinal expanse, for example sequential regions, can be captured, if necessary also with different or varying resolution.

A further development consists in that the two partial sections form a first overlap region, which covers a common section of the capture region. This region is preferably provided in the center region of the machine table, and guarantees that in spite of the two-part division of the capture region, the entire capture region is captured continuously.

An embodiment also consists in that the ratio of the normal line distance between the image capture apparatus and the longitudinal expanse of the machine table amounts to less than 1, in particular in the range from 1 to 0.25. On the basis of usual embodiments of bending machines and with regard to guaranteeing or achieving the present capture region, the normal line distance between machine table and image capture apparatus is limited. According to the present embodiment, the image capture apparatus can also be used for wide, in particular very wide (up to approximately 6 m) bending machines.

A further development consists in that the normal line distance between the image capture apparatus and the machine table amounts to 60 cm to 150 cm. This embodiment is advantageous with regard to good local resolution of the image capture apparatus or of the individual image capture means, since in this way, the demands on the physical capture capacity of the individual image capture means are reduced. In particular, ultra-high-resolution image capture means are not required. This also holds true for the optics used—it is possible to make do with standard (consumer) optics.

A further development also consists in that the optical centers of the two image capture means coincide in comparison with the longitudinal expanse of the machine table, in particular are disposed at a distance from one another of less than 10 cm. Due to mechanical/design conditions, it is only possible to place the optical centers of the two image capture means so as to coincide with one another when using very complicated special solutions. The advantage of the further development now particularly lies in that image capture of the entire capture region is possible with simple standard components. In comparison with the longitudinal expanse of the capture region, which lies in the meter range, for example 1-6 m, placement at a distance of 10 cm can be viewed as coinciding placement. The representation errors that result from this can be ignored, as compared with the longitudinal expanse of the capture region as a whole.

A further embodiment also consists in that the opening angle of an image capture means, parallel to the working plane, amounts to at least 60°, in particular 66°. This further development has the advantage that this capture region can be captured with usual, easily available, and, in particular, cost-advantageous optics. These optics generally have only slight distortion errors, and therefore complicated image correction is not necessary. Orientation parallel to the working plane is understood to mean that the surface defined by the shanks of the angle is oriented parallel to the working plane.

A further development also consists in that an optical axis of the image capture means is pivoted in the direction parallel to the working plane, about a pivot angle relative to the normal line of the image capture means relative to the machine table. Therefore each image capture means is not directed precisely downward, and therefore two sections exist in the capture region, each of which is captured only by one image capture means, and an overlap region exists, which is captured by both image capture means.

According to a further development, it is provided that the pivot angle of the two image capture means is the same, and amounts to 20° to 30°, in particular 25°. According to this embodiment, the capture region is captured symmetrically by the image capture means, with reference to the position of the image capture apparatus. Preferably, the image capture apparatus will be disposed in the center of the longitudinal expanse of the press beam.

According to a further development, however, it is also provided that the pivot angle of the two image capture means is not the same, and amounts to 20° to 30° and 40° to 30°, in particular 25° and 35°. According to this further development, the capture region is captured by the image capture means asymmetrically with reference to the position of the image capture apparatus. Preferably, the image capture apparatus will be disposed in the center section, but outside of the center of the longitudinal expanse of the press beam. The opposite range information for the pivot angle results from the asymmetrical distribution and from the fact that the entire capture region must be covered.

A further development also consists in that an image synthesis module is present, with which the cameras of the front image capture apparatus are connected, and which image synthesis module is configured for generation of a front overall image of the front-side working and manipulation space. The image synthesis module can be present in the machine controller, which is necessarily required, but it is also possible that this module is provided as an independent image processing module. The image synthesis module preferably has a data processing device that is optimized for image processing or image editing, and is particularly configured for superimposition or melding of the two individual images of the image capture means, to form an overall image.

A further development also consists in that a further image capture apparatus is disposed in the machine space above the machine table, in a center section of the longitudinal expanse of the press beam, which apparatus has at least two further image capture means, which are preferably configured as cameras, and that the cameras are oriented in the direction of a rear stop present in the machine space. Due to design conditions of the bending machine, a machine operator generally does not have a direct view into the machine space. With this further development, it is now guaranteed that even this region, which cannot be looked into directly, is shown to the machine operator on the display means.

A further embodiment also consists in that an image synthesis module is present, with which the cameras of the rear further image capture apparatus are connected, and which image synthesis module is configured for generation of a rear overall image of the rear machine space. The properties described above for the front overall image should be applied analogously to this embodiment.

An advantageous further development consists in that the image synthesis module is configured for generating an overall image of the front working and manipulation space and of the rear machine space. In this way, the machine operator can be shown an image of the region in front of the bending machine and, at the same time, also an image of the region in the interior of the bending machine, on the display means.

According to a further embodiment, it is provided that an image analysis module is present, which is connected with the image synthesis module, and which image analysis module is configured for recognition of a structure of a metal sheet to be processed. In this way, it can be achieved that a workpiece disposed in the capture region is recognized, in particular that an outer contour of the metal sheet is recognized. The image analysis module can analyze the captured image by means of a contrast analysis and/or a reflection analysis, for example, and thereby recognize the inserted metal sheet. It is particularly advantageous if edges and/or distinctive structures of the inserted metal sheet are recognized, since checking for correct insertion can be carried out in this way.

The task of the invention is also accomplished by means of a method for representation of an overall image of a longitudinally extended work area of a bending machine, which method is carried out on a present bending machine. In this regard, a region along the machine table is captured as a front picture-taking region by the image capture apparatus, which is disposed in the working and manipulation space, and shown on a display means as a live image. A first section is captured by a first camera of the image capture apparatus, as a first partial image, and a second section is captured by the second camera of the image capture apparatus, as a second partial image along the front picture-taking region. The first and second section of the front picture-taking region are captured to overlap in a partial section, which forms a first overlap region. Image orientation and image scaling of the first and second partial image are carried out by the image synthesis module. Furthermore, in the first overlap region, an image synthesis of the first and second partial image is carried out by the image synthesis module, and the live image is formed.

In order to be able to join the captured images of the two cameras together to form an overall image, the possibility exists of joining the images with one another without any content processing, but this is connected with disadvantages. For this purpose, it is particularly required that the two cameras are disposed and adjusted so as to be oriented very precisely relative to one another, and this orientation must be maintained in spite of the vibrations during proper operation of the bending press.

With the present embodiment, it is guaranteed that a common region of the front picture-taking region is captured by both cameras in the overlap region. After orientation and scaling of the partial images to balance out possible imprecisions of the camera orientation, and after equalization and lighting adaptation, if necessary, the partial images are brought together in the overlap region—for example by means of a progressive function. In the synthesized overall image, its origin from two partial images can no longer be recognized, to the greatest possible extent.

According to a further embodiment, it is provided that a region along the machine table is captured as a rear picture-taking region by the further image capture apparatus disposed in the machine space, and displayed on a display means as a live image. In this regard, a first section is captured by the first camera of the further image capture apparatus as a third partial image, and a second section along the rear picture-taking region is captured by the second camera of the further image capture apparatus as a fourth partial image. The first and second section of the rear picture-taking region are captured to overlap in a partial section, which forms a second overlap region. Image orientation and image scaling of the third and fourth partial image are carried out by the image synthesis module. In the second overlap region, image synthesis of the third and fourth partial image is carried out, and the live image is formed.

The description of the above embodiment variant should be applied analogously to the embodiment previously.

A further development furthermore provides that the front and the rear picture-taking regions are captured so as to overlap and form a third overlap region, and in the third overlap region, image synthesis of all four partial images is carried out, and the live image is formed. This further development has the advantage that a single overall image is generated from the individual partial images and shown to the machine operator on the display means. The machine operator therefore receives an overall representation of the region in front of the bending machine and of the machine interior, which generally cannot be looked at directly.

A further development, according to which a reference image of the workpiece, stored in memory in the image synthesis module, is shown in the live image on the display means, is also advantageous. Therefore a representation of the correct orientation of the workpiece is available to the machine operator. The stored reference image can comprise, in particular, not only the correct orientation of the workpiece but also the correct position with reference to the bending tools (upper and lower tool).

According to a further embodiment, it is provided that the orientation of a workpiece to be processed is recognized by the image analysis module by means of a pattern analysis in the live image, and that transformation information is formed by means of a comparison with a stored reference image of the workpiece, and shown in the live image on the display means.

Preferably, the image analysis module, just like the image synthesis module, will be disposed integrated into the machine controller of the bending machine, or also will be provided as an independent module. It is also possible that the machine controller has a data connection to a production planning system. Reference images can now be stored in memory in the independent module, in the machine controller or also in the production planning system. A reference image is understood to mean a representation of the workpiece to be processed; this can also be CAD design data. Preferably, the reference image is superimposed on the captured live image, so as to be able to give the machine operator visual feedback regarding the correct insertion position.

The transformation information can be formed by means of edges emphasized in the live image, for example, so that the machine operator can recognize how the workpiece is to be oriented. However, it is also possible that the transformation information comprises direction arrows or movement instructions.

A further development can also consist in that the transformation information is generated as an animation. For example, the transformation can be formed by a VR module from the current and the correct reference orientation, by means of movement tracks, or by means of a moving representation of the workpiece to achieve the correct orientation.

A further development also consists in that a reference image of the workpiece stored in memory in a production planning system is accessed by the image analysis module by way of a data connection. Thereby the possibility exists of being able to access current design and production data directly.

A further development, according to which an identifier of a bending tool disposed in the press beam and/or in the machine table is read and evaluated by the image analysis module, by means of a pattern analysis in the live image, is also advantageous. With this further development it is possible to check whether the correct tool set is installed and whether the workpiece is disposed at the correct position along the press beam for the next processing step.

Further advantageous embodiments relate to further developments of the display means. For example, it can be provided that the display means is formed by a flat screen that is disposed on the press beam, in particular on the front side. Due to its slight depth and low weight, a flat screen can easily be affixed in the field of vision of the operator. Also, a flat screen achieves a brightness of the image being shown such that it can be easily recognized even during daylight in a production building. This further development explicitly includes an embodiment variant in which the display means is also formed by more than one flat screen. Depending on the machine width, embodiments are conceivable in which multiple flat screens are disposed along the press beam and together form the display means.

A further advantageous embodiment also consists in that the flat screen is disposed in an installation apparatus, which installation apparatus allows positioning of the flat screen along the longitudinal expanse of the press beam. A bending press generally has a great longitudinal expanse, so that central positioning of the display is advantageous only for bending work in the center region of the bending press. With this further development, the flat screen can be moved along the bending press and, in particular, can be positioned in the immediate vicinity of the bending forming to be carried out. A further embodiment can also consist in that the positioning takes place using a setting means, so that no action by the machine operator is required. The display is then moved to the location of the next bending forming step, in each instance, by the machine controller.

A flat screen is preferably understood to be an active, self-illuminating display, for example a TFT display or an OLED display. However, passive displays can also be used, for example an ePaper display. This has the advantage that reading it is possible without problems even in the case of very bright ambient light.

For a better understanding of the invention, it will be explained in greater detail below, using the following figures.

The figures show, each in a greatly simplified, schematic representation:

FIG. 1 an overview representation of the bending machine with a work area image capture apparatus according to an embodiment variant;

FIGS. 2a) and b), the geometric situation of image capture according to two possible embodiment variants;

FIG. 3 a top view of the bending machine with a further embodiment of a work area image capture apparatus;

FIG. 4 the formation of an overall image from captured partial images;

FIG. 5 a further possible embodiment with an overlay of a transformation information.

FIG. 1 shows an embodiment of the present bending machine 1 with a work area image capture apparatus 2. The bending machine 1 has a machine frame that comprises two side parts 3, wherein the longitudinally extended machine table 4 is disposed between these side parts 3, and wherein the longitudinal expanse 5 of the machine table 4 defines a machine width. Furthermore, a press beam 6 is disposed in the machine frame, in guided manner, and is moved relative to the machine frame by drive means 7, and, in particular, carries out the bending forming, particularly when moving downward. The movement direction 8 of the press beam 6 and its longitudinal expanse 9, parallel to the longitudinal expanse 5 of the machine table 4, define a working plane.

The working plane establishes a working and manipulation space situated in front of the bending machine 1, and a rear machine space, separated from the latter and, in particular, closed off. It is pointed out that the bending line, in other words the line on which the upper tool contacts the workpiece and presses it into the lower tool, lies in the working plane. The image capture apparatus 2 has a capture region 10, which is oriented in the direction of the machine table 4. The captured section is shown on a display means 11 connected with the image capture apparatus 2.

The image capture apparatus 2 is disposed in a press beam casing 12, which press beam casing 12 is situated in front of the press beam 6 from the point of view of the machine operator, and, in particular, thereby also offers protection against the moving press beam 6. For design reasons, so as to achieve the largest possible free bending room, the press beam casing 12 is disposed as close as possible to the press beam, and thereby has a very slight horizontal distance from the bending line 13 in a top view. The bending line 13 is the line on which an upper tool 14 disposed in the press beam 6 contacts a workpiece to be formed and presses it into a lower tool 15 disposed on the machine table 4.

The image capture apparatus 2 has two image capture means 16, which are preferably formed by 2D cameras. In particular, a partial section of the machine table 4 is captured by each of these image capture means 16. It is pointed out that this capture region or each of these capture sections can comprise not only a surface of the machine table 4 but also the region along the bending line 13. In particular, this means that not only does a workpiece to be formed, laid onto the machine table 4, lie in the capture region 10 and is therefore captured, but also a workpiece laid onto the lower tool 15 for bending falls into the capture region 10.

For technological reasons, a distance 18 will exist between the optical centers 17 of the two image capture means 16, but since this distance 18 amounts to a few centimeters, in particular 10 cm, it can be ignored compared with the machine width or the longitudinal expanse 5. Therefore it can be assumed that the optical centers 17 of the two image capture means 16 are placed so as to coincide.

In the figure, it is also shown that the entire capture region 10 is captured, by each image capture means 16, only in a partial section 19, wherein the partial sections 19 overlap in a first overlap region 20.

The two image capture means 20 of the image capture apparatus 2 are connected with an image synthesis module 21, which is configured for processing the captured first and second partial image and for carrying out a synthesis of the two images in the captured first overlap region 20, so that an overall image is generated, which is subsequently shown on the display means 11. Preferably, the image synthesis module 21 will be disposed in a machine controller 22, which carries out and monitors control of the sequences of the bending machine 1. This machine controller 22 can also be connected with a central production planning system, so that the machine controller and thereby the further modules directly disposed in it can have direct access to the design data of the workpiece to be formed. For example, an image analysis module 23 can also be present in the machine controller 22, which module is connected with the image synthesis module and can recognize a metal sheet to be formed, in particular the orientation of the metal sheet, in the captured image.

In FIGS. 2a and 2b, two possible embodiments of the placement and the orientation of the image capture means are shown. To simplify the representation, and, in particular, to make the optical conditions clear, the elements of the bending machine are not shown.

FIG. 2a shows the optical conditions of the two image capture means in a first configuration, in which the two partial sections are configured symmetrically relative to the normal line distance of the image capture apparatus relative to the machine table.

The optical axes of the two image capture means 16 of the image capture apparatus 2 are disposed at a distance from one another, wherein this distance can be ignored with reference to the longitudinal expanse of the capture region 10, so that it can be assumed that the optical axes are placed so as to coincide. The slight differences that are actually present due to the real distances placement have no importance in the overall consideration. According to a preferred embodiment, the image capture means 16 is formed by a camera, so that a first camera 24 captures a first section 25 as a first partial image, and a second camera 26 captures a second section 27 as a second partial image.

Each image capture means 16 has an image opening angle 28 that is disposed symmetrically relative to the optical axis 29 of the image capture means. The capture region of the image capture means 16, viewed in the direction of the optical axis 29, is generally configured to be rectangular, wherein the opening angle 28 herein is understood to mean that the angle, i.e. the surface formed by the angle, is oriented parallel to the longitudinal expanse of the capture region and thereby parallel to the longitudinal expanse of the press beam, and thereby defines the greatest longitudinal expanse of the capture region.

In the embodiment according to FIG. 2a, the two optical axes 29 are pivoted symmetrically about a pivot angle 30 with reference to the normal line distance 31. In this embodiment the pivot angle amounts to between 20 and 30°, wherein an angle of 25° is preferred. With an opening angle 28 of at least 60°, but preferably 66°, a capture region 10 of approximately 1 to approximately 6 m can be captured at a normal line distance 31 of 60 cm to 150 cm.

FIG. 2b shows a further possible embodiment, in which the optical axes 29 are pivoted asymmetrically relative to the normal line distance 31. The pivot angle 30 amounts to 20° to 30° for the second camera 26, and, conversely, 40° to 30° for the first camera 24. A pivot angle of 25° for the second camera 26 and 35° for the first camera 24 is preferred.

Here, too, a first section 25 is once again captured by the first camera 24, and a second section 27 is captured by the second camera 26, wherein the two sections overlap in a first overlap region 20.

FIG. 3 shows a top view of the present bending machine 1; in particular, the machine table 4, the side parts 3, and the press beam 6, which can be moved by the drive means 7, are shown. The press beam 6 and its movement direction define a working plane 32 (in the normal line direction relative to the page), which working plane 32 has a front working and manipulation space 33 and a rear machine space 34, separated from the latter, and, in particular, closed off.

An image capture apparatus 2 having two image capture means 16 is disposed in the front working and manipulation space 33. In particular, this image capture apparatus 2 is disposed in the press beam casing 12.

According to a further embodiment, however, a further image capture apparatus 35 is disposed in the machine space 34, above the machine table 4, in a center section of the longitudinal expanse 9 of the press beam 6. This further image capture apparatus 35 also has two image capture means 16, which are also preferably configured as 2D cameras. The rear machine space 34 is captured by this further image capture apparatus 35, in particular a rear stop 36 having contact fingers 37 to be laid against the workpiece to be formed, which is disposed there.

For a description of the optical conditions relating to this further image capture apparatus 35, reference is made to the description of FIGS. 1 and 2, which should be applied analogously to the further image capture apparatus 35. In particular, a first section is captured by the first camera 24 of the further image capture apparatus 35 as a third partial image 42, and a second section is captured by the second camera 26 of the further image capture apparatus as a fourth partial image 43, along the rear picture-taking region. Likewise, a section of the capture region is captured by both image capture means 16, and thereby a second overlap region 44 is formed.

It is explicitly pointed out that the terms first and second image capture apparatus and first and second camera are used not only for the front image capture apparatus (in the working and manipulation space) but also for the rear further image capture apparatus (in the machine space). It should not be assumed that these are the same apparatuses, but rather that for simplification of the description, the terms were selected to be the same.

FIG. 4 shows a representation as to how the captured partial images are joined together to form a common live image. The elements of the bending machine and the elements of the image capture apparatuses are not shown, for the sake of simplification. The first 38 and second 39 partial image are captured by the image capture means of the image capture apparatus in the press beam casing, in other words in the front working and manipulation space 33. Due to the placement of the image capture means of the image capture apparatus, the front picture-taking region 40 is captured by the image capture means in such a manner that the same section of the front picture-taking region 40 is shown in a first overlap region 20 in both captured partial images.

A rear picture-taking region 41 is captured by the image capture means of the further image capture apparatus, which are disposed in the rear machine space 34, as a third 42 and fourth 43 partial image. Here, too, capture of the partial images takes place in such a manner, once again, that a section of the rear picture-taking region 41 is shown in both partial images as a second overlap region 44.

Just like for the front picture-taking region 40, image orientation and image scaling of the third 42 and fourth 43 partial image is carried out by the image synthesis module, and an image synthesis of the two partial images is carried out in the second overlap region 44, and the live image is formed from this.

In addition, it is provided, according to an embodiment, that also the front 40 and rear 41 picture-taking region are captured to overlap, in particular that the first 38 and third 42 partial image and the second 39 and fourth 43 partial image are superimposed, wherein all four partial images are superimposed in a center section. By means of this embodiment, a third overlap region 45 is formed, in which a synthesis of all four partial images is carried out by the image synthesis module, and the live image is formed. With this embodiment, the machine operator is shown a live image of the conditions in the front working and manipulation space 33, and, at the same time, in the rear machine space 34, on the display means.

FIG. 5 shows a further possible embodiment, in which the orientation of the workpiece 46 to be formed is determined, the determined orientation is compared with a reference orientation stored in memory, and, in the event of a deviation, transformation information 47 is shown. In the case of bending forming, the workpiece 46 to be processed is passed to the bending machine and generally laid down on the lower tool 15, and oriented there in such a manner that the next bending forming coincides with the bending line 13. Specifically in the case of small lot sizes, it can happen that the machine operator inserts the workpiece 46 into the bending machine in the incorrect orientation, and therefore the next bending step would be carried out incorrectly. The disposed workpiece can be recognized by means of an image analysis of the live image and of the individual partial images by means of pattern recognition. In particular, the outline can be recognized, wherein after a comparison with a reference image stored in memory, the correct reference orientation can be overlaid in the live image as transformation information 47. Thereby the machine operator can recognize very easily whether the workpiece was inserted correctly and the bending forming should be carried out. The transformation information 47 can also be partially animated; for example, direction instructions as to how the workpiece is to be manipulated can be overlaid onto the live image. Based on the instructions, the machine operator can very quickly produce the correct orientation of the workpiece, and thereby the bending process is clearly delayed less.

However, it is also possible to merely show the reference position and/or the reference orientation as transformation information, without any determination of the orientation and any comparison with a reference orientation stored in memory.

FIG. 1 shows a further possible embodiment, according to which an identification marker 48 is affixed to the bending tools, which be found and recognized in the captured partial image or in the generated live image. The identification marker can be configured as a 1D or 2D code, for example. By means of reading and analyzing this identification marker, for example using the image analysis module, it can also be determined by the image analysis module or the machine controller whether the correct tools were set up at the correct position.

The advantage of the present bending machine now lies in that it is possible to give the machine operator a total overview of the operating process at all times. In particular, the machine operator is supported in the production of small lot sizes, in that he/she is shown relevant information relating to the bending process directly in the live image on the display means.

In conclusion, it should be stated that in the different embodiments described, the same parts are provided with the same reference symbols or the same component designations, wherein the disclosures contained in the description as a whole can be applied analogously to the same parts having the same reference symbols or the same component designations. Also, the position information selected in the description, such as at the top, at the bottom, on the side, etc., relates to the figure being directly described and shown, and this position information must be applied analogously to a new position in the case of a change in position.

Further embodiments of the bending machine with a work area image capture apparatus, which might be independent in and of themselves, are shown in FIGS. 1, 3 and 5, wherein once again, the same reference symbols or component designations are used for the same parts as in the preceding figures. In order to avoid unnecessary repetition, reference is made to the detailed description in the preceding figures, i.e. this is pointed out.

The exemplary embodiments show possible embodiment variants of the bending machine with a work area image capture apparatus, wherein it should be noted at this point that the invention is not restricted to the embodiment variants of the same that are specifically shown, but rather, instead, various combinations of the individual embodiment variants with one another are possible, and this variation possibility lies within the ability of a person skilled in the art and working in this technical field, on the basis of the teaching of the present invention concerning technical action.

Furthermore, individual characteristics or combinations of characteristics of the different exemplary embodiments shown and described can also represent independent inventive solutions or solutions according to the invention, by themselves.

The task underlying the independent inventive solutions can be derived from the description.

All information regarding value ranges in the present description should be understood to mean that these include any and all partial ranges of them; for example, the information 1 to 10 should be understood to mean that all partial ranges, proceeding from the lower limit 1 and also including the upper limit 10 are also included; i.e. all partial ranges start with a lower limit of 1 or more and end at an upper limit of 10 or less, for example 1 to 1.7, or 3.2 to 8.1, or 5.5 to 10.

Above all, the individual embodiments shown in the figures can form the object of independent solutions according to the invention. The tasks and solutions in this regard, according to the invention, can be derived from the detailed descriptions of these figures.

For the sake of good order, it should be pointed out, in conclusion, that for a better understanding of the structure of the bending machine with a work area image capture apparatus, this machine and its components were shown not to scale and/or increased in size and/or reduced in size, in part.

REFERENCE SYMBOL LISTING 1 bending machine
2 image capture apparatus
3 side parts
4 machine table
5 longitudinal expanse
6 press beam
7 drive means
8 movement direction
9 longitudinal expanse
10 capture region
11 display means
12 press beam casing
13 bending line
14 upper tool
15 lower tool
16 image capture means
17 optical center
18 distance
19 partial section
20 first overlap region
21 image synthesis module
22 machine controller
23 image analysis module
24 first camera
25 first section
26 second camera
27 second section
28 opening angle
29 optical axis
30 pivot angle
31 normal line distance
32 working plane
33 working and manipulation space
34 machine space
35 further image capture apparatus
36 rear stop
37 contact finger
38 first partial image
39 second partial image
40 front picture-taking region
41 rear picture-taking region
42 third partial image
43 fourth partial image
44 second overlap region
45 third overlap region
46 workpiece
47 transformation information
48 identification marker

The invention claimed is:

1. A bending machine (1) with a work area image capture apparatus (2), wherein the bending machine (1) has a machine frame,
a longitudinally extended machine table (4), fixed in place, and a longitudinally extended press beam (6), which press beam (6) is guided in the machine frame and held by a drive means (7), so as to be movable relative to the latter,
and wherein the machine frame furthermore has two side parts (3), which are spaced apart from one another by a machine width in the direction of the longitudinal expanse (5) of the machine table (4),
and wherein the longitudinal expanse (5) and the movement direction (8) of the press beam (6) define a working plane (32), and the working plane (32) establishes a front working and manipulation space (33) and a rear machine space (34), which is distinguished from the former and, in particular, closed off, and wherein an image capture apparatus (2) is disposed in the working and manipulation space (33) above the machine table (4), in a center section of the longitudinal expanse (9) of the press beam, in a press beam casing (12), and wherein the image capture apparatus (2) has two image capture means (16), wherein a capture region (10) of the image capture apparatus (2) is oriented in the direction of the machine table (4),
and wherein each image capture means (16) captures a partial section (19) in the direction of the machine table (4),
and wherein the image capture apparatus is connected with a display means (11), and
wherein the display means (11) is configured for representation of the captured image of the capture region (10), and
the optical centers of the two image capture means (16) coincide in comparison with the longitudinal expanse (5) of the machine table (4), in particular are disposed at a distance (18) from one another of less than 10 cm.

2. The bending machine according to claim 1, wherein the image capture apparatus (16) is formed by a 2D camera.

3. The bending machine according to claim 1, wherein the image capture apparatus (16) is formed by a laser scanner.

4. The bending machine according to claim 1, wherein the two partial regions (19) form a first overlap region (20), which covers a common section of the capture region (10).

5. The bending machine according to claim 1, wherein the ratio of the normal line distance (31) between the image capture apparatus and the longitudinal expanse (5) of the machine table (4) amounts to less than 1, in particular in the range from 1 to 0.25.

6. The bending machine according to claim 1, wherein the normal line distance (31) between the image capture apparatus and the machine table (4) amounts to 60 cm to 150 cm.

7. The bending machine according to claim 1, wherein the opening angle (28) of an image capture means (16), parallel to the working plane (32), amounts to at least 60°, in particular 66°.

8. The bending machine according to claim 7, wherein the pivot angle (30) of the two image capture means (16) is the same, and amounts to 20° to 30°, in particular 25°.

9. The bending machine according to claim 7, wherein the pivot angle (30) of the two image capture means (16) is not the same, and amounts to 20° to 30° and 40° to 30°, in particular 25° and 35°.

10. A bending machine according to claim 1, wherein an optical axis (29) of the image capture means (16) is pivoted in the direction parallel to the working plane (32), about a pivot angle (30) relative to the normal line distance of the image capture means (16) relative to the machine table (4).

11. The bending machine according to claim 1, wherein an image synthesis module (21) is present, with which the cameras of the front image capture apparatus are connected, and which image synthesis module (21) is configured for generation of a front overall image of the front working and manipulation space (33).

12. The bending machine according to claim 11, wherein the image synthesis module (21) is configured for generation of an overall image of the front working and manipulation space (33) and of the rear machine space (34).

13. The bending machine according to claim 11, wherein an image analysis module (23) is present, which is connected with the image synthesis module (21), and which image analysis module (23) is configured for recognition of a structure of a metal sheet to be processed.

14. The bending machine according to claim 1, wherein a further image capture apparatus (35) is disposed in the machine space (34) above the machine table (4), in a center section of the longitudinal expanse (9) of the press beam (6), which apparatus has at least two further image capture means (16), which are preferably configured as cameras, and wherein the cameras are oriented in the direction of a rear stop (36) present in the machine space (34).

15. The bending machine according to claim 14, wherein an image synthesis module (21) is present, with which the cameras of the rear further image capture apparatus (35) are connected, and which image synthesis module (21) is configured for generation of a rear overall image of the rear machine space (34).

16. A method for representation of an overall image of a longitudinally extended work area of a bending machine (1), carried out on the bending machine (1) according to claim 1, wherein a region along the machine table (4) is captured as a front picture-taking region (40) by the image capture apparatus, which is disposed in the working and manipulation space (33), and shown on a display means (11) as a live image,
wherein
a first section (25) is captured by a first camera (24) of the image capture apparatus, as a first partial image (38), and a second section (27) is captured by the second camera (26) of the image capture apparatus, as a second partial image (39) along the front picture-taking region (40), wherein the first and second section of the front picture-taking region (40) are captured to overlap in a partial section (19), and forms a first overlap region (20), and image orientation and image scaling of the first (38) and second (39) partial image are carried out by the image synthesis module (21), and an image synthesis of the first (38) and second (39) partial image is carried out in the first overlap region (20), and the live image is formed.

17. The method according to claim 16, wherein
a region along the machine table (4) is captured as a rear picture-taking region (41) by the further image capture apparatus disposed in the machine space (34), and displayed on a display means (11) as a live image, wherein a first section (25) is captured by the first camera (24) of the further image capture apparatus (35) as a third partial image (42), and a second section (27) along the rear picture-taking region (41) is captured by the second camera (26) of the further image capture apparatus (35) as a fourth partial image (43), wherein the first (25) section and the second (27) section of the rear picture-taking region (41) are captured to overlap in a partial section (19), and form a second overlap region (44), and image orientation and image scaling of the third (42) and fourth (43) partial image are carried out by the image synthesis module (21), and in the second overlap region (44), image synthesis of the third (42) and fourth (43) partial image is carried out, and the live image is formed.

18. The method according to claim 17, wherein the front (40) picture-taking region and the rear (41) picture-taking region are captured so as to overlap and form a third overlap region (45), and in the third overlap region (45), image synthesis of all four partial images is carried out, and the live image is formed.

19. The method according to claim 16, wherein a reference image of the workpiece (46), stored in memory by the image synthesis module (21), is shown in the live image on the display means (11).

20. The method according to claim 16, wherein the orientation of a workpiece (46) to be processed is recognized by the image analysis module (23) by means of a pattern analysis in the live image, and wherein transformation information (47) is formed by means of a comparison with a stored reference image of the workpiece (46), and shown in the live image on the display means (11).

21. The method according to claim 20, wherein the transformation information (47) is generated as an animation.

22. The method according to claim 16, wherein a reference image of the workpiece (46) stored in memory in a production planning system is accessed by the image analysis module (23) by way of a data connection.

23. The method according to claim 16, wherein an identifier of a bending tool disposed in the press beam (6) and/or in the machine table (4) is read and evaluated by the image analysis module (23), by means of a pattern analysis in the live image.

* * * * *